(12) United States Patent
Nagata et al.

(10) Patent No.: US 9,660,705 B2
(45) Date of Patent: May 23, 2017

(54) ON-BOARD UNIT, COMMUNICATION METHOD, AND RECORDING MEDIUM

(71) Applicant: MITSUBISHI HEAVY INDUSTRIES MECHATRONICS SYSTEMS, LTD., Kobe-Shi, Hyogo (JP)

(72) Inventors: Takeshi Nagata, Tokyo (JP); Yoshifumi Hayakawa, Tokyo (JP); Hisaji Takeuchi, Tokyo (JP); Jun Yasui, Tokyo (JP); Hideaki Murata, Tokyo (JP)

(73) Assignee: MITSUBISHI HEAVY INDUSTRIES MECHATRONICS SYSTEMS, LTD., Hyogo (JP)

(*) Notice: Subject to any disclaimer, the term of this patent is extended or adjusted under 35 U.S.C. 154(b) by 0 days.

(21) Appl. No.: 14/652,779

(22) PCT Filed: Dec. 16, 2013

(86) PCT No.: PCT/JP2013/083543
§ 371 (c)(1),
(2) Date: Jun. 16, 2015

(87) PCT Pub. No.: WO2014/098003
PCT Pub. Date: Jun. 26, 2014

(65) Prior Publication Data
US 2015/0326283 A1   Nov. 12, 2015

(30) Foreign Application Priority Data
Dec. 18, 2012   (JP) ................................. 2012-276244

(51) Int. Cl.
*H04W 4/00* (2009.01)
*H04B 7/0404* (2017.01)
(Continued)

(52) U.S. Cl.
CPC .......... *H04B 7/0404* (2013.01); *H04M 15/61* (2013.01); *H04M 15/68* (2013.01);
(Continued)

(58) Field of Classification Search
None
See application file for complete search history.

(56) References Cited

U.S. PATENT DOCUMENTS

| 9,083,581 | B1* | 7/2015 | Addepalli | ............. H04W 4/046 |
| 2002/0186144 | A1* | 12/2002 | Meunier | ................ G07B 15/00 340/4.6 |

(Continued)

FOREIGN PATENT DOCUMENTS

| JP | 2001-54168 A | 2/2001 |
| JP | 2006-310968 A | 11/2006 |

(Continued)

OTHER PUBLICATIONS

International Preliminary Report on Patentability mailed Jul. 2, 2015, corresponding to International application No. PCT/JP2013/083543.

(Continued)

*Primary Examiner* — Phirin Sam
(74) *Attorney, Agent, or Firm* — Kanesaka Berner and Partners LLP

(57) ABSTRACT

An on-board unit includes a first antenna and a second antenna, a traffic data service communicating section corresponding to a traffic data service; a billing service communicating section corresponding to a billing service, a switch which switches a connection relation between each of the first antenna and the second antenna and the traffic data service communicating section and the billing service communicating section, a control section which controls the switch. When the operation mode is switched from the traffic (Continued)

data service mode to the billing service mode, the on-board unit is set to a switching communication mode in which one of the first antenna and the second antenna is connected with the traffic data service communicating section and the other is connected with the billing service communicating section.

6 Claims, 5 Drawing Sheets

(51) Int. Cl.
    *H04W 24/02*     (2009.01)
    *H04M 15/00*     (2006.01)
    *H04W 4/24*     (2009.01)
    *H04W 4/04*     (2009.01)

(52) U.S. Cl.
    CPC ............. *H04M 15/83* (2013.01); *H04W 4/00* (2013.01); *H04W 4/24* (2013.01); *H04W 24/02* (2013.01); *H04W 4/046* (2013.01)

(56) References Cited

U.S. PATENT DOCUMENTS

| | | |
|---|---|---|
| 2006/0030278 A1 | 2/2006 | Konaka |
| 2010/0036595 A1* | 2/2010 | Coy .................... G08G 1/0104 701/119 |
| 2011/0270517 A1* | 11/2011 | Benedetti ............... G01C 21/20 701/533 |
| 2012/0054028 A1* | 3/2012 | Tengler .............. G01C 21/3697 705/14.49 |
| 2012/0149389 A1* | 6/2012 | Lin ..................... H04W 74/002 455/456.1 |
| 2013/0006725 A1* | 1/2013 | Simanek ............... G07B 15/063 705/13 |
| 2013/0151065 A1* | 6/2013 | Ricci ......................... G06F 9/54 701/31.4 |

FOREIGN PATENT DOCUMENTS

| | | |
|---|---|---|
| JP | 2008-99085 A | 4/2008 |
| WO | 2004/093346 A1 | 10/2004 |

OTHER PUBLICATIONS

Decision to Grant a Patent in Singapore Patent Application No. 11201504693X, mailed Feb. 4, 2016.

International Search Report for PCT/JP2013/083543 mailed Mar. 4, 2014.

Decision to Grant a Patent in JP Patent Application No. 2012-276244 mailed Feb. 15, 2017.

\* cited by examiner

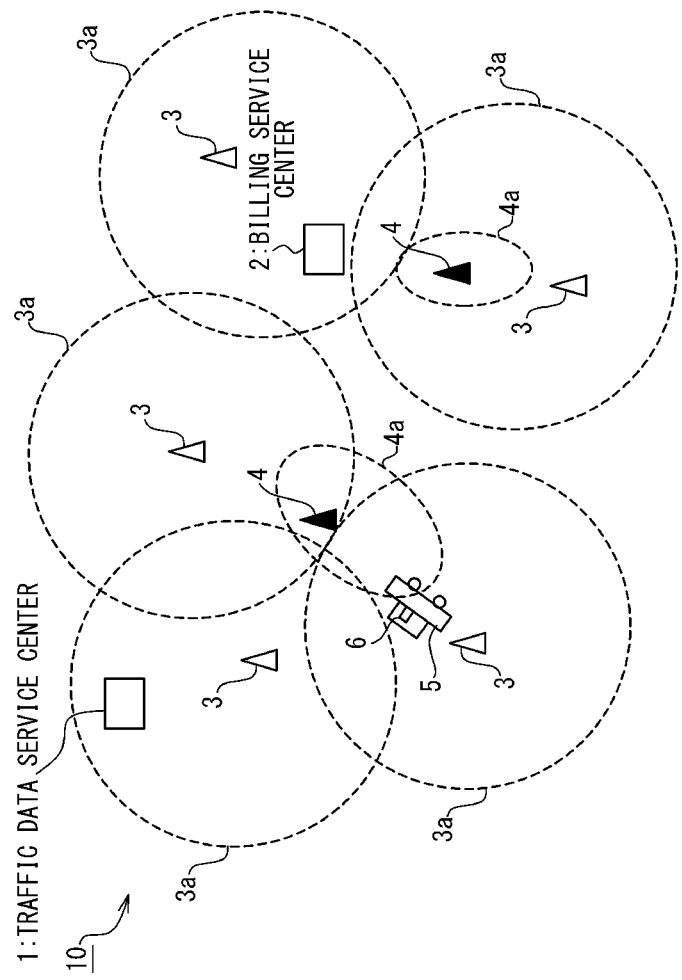

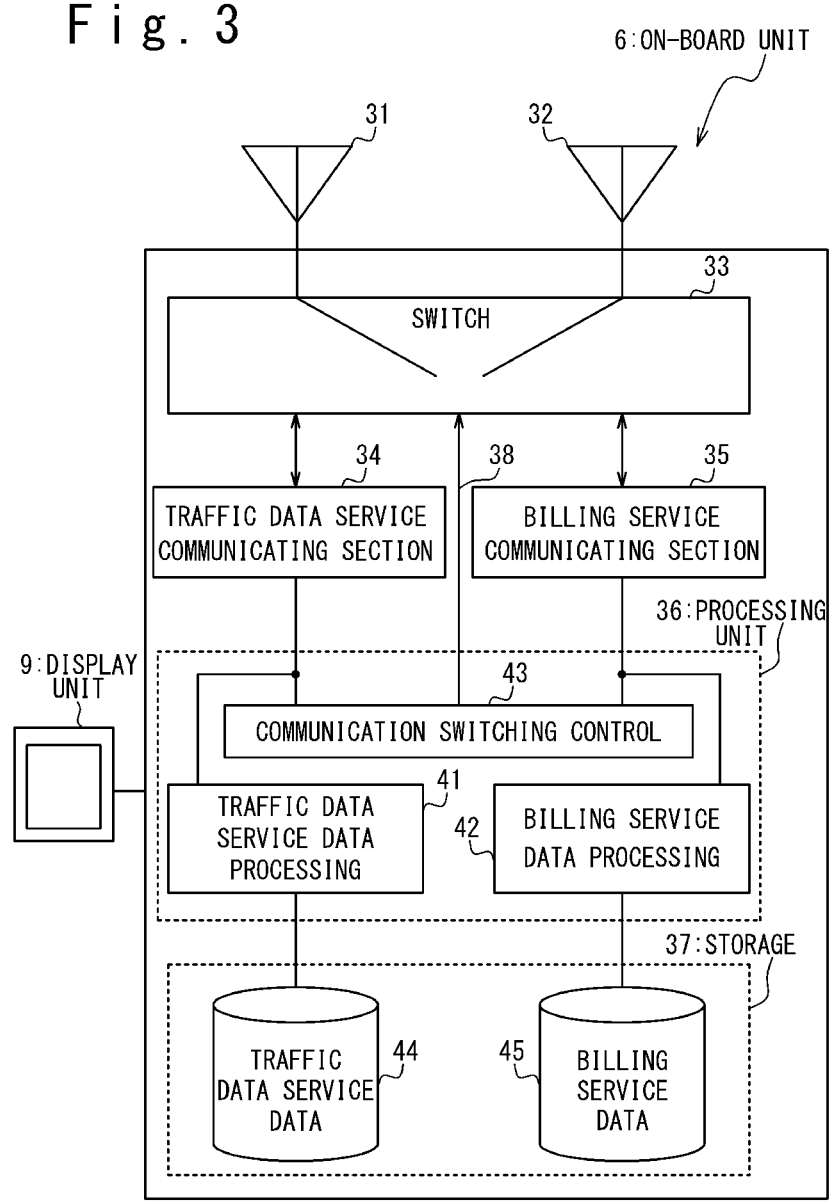

TRAFFIC DATA SERVICE MODE

SWITCHING COMMUNICATION MODE

BILLING SERVICE MODE

ON-BOARD UNIT, COMMUNICATION METHOD, AND RECORDING MEDIUM

RELATED APPLICATIONS

The present application is a National Phase of International Application Number PCT/JP2013/083543, filed Dec. 16, 2013, which claims priority to Japanese Application Number 2012-276244, filed Dec. 18, 2012.

TECHNICAL FIELD

The present invention relates to an on-board unit, a communication method and a recording medium, and especially, relates to an on-board unit, a communication method, and a recording medium, which is used for a communication system configured to provide a plurality of services to the on-board unit loaded in a vehicle.

BACKGROUND ART

An on-board unit in recent years is required to provide a plurality of services. For example, the on-board unit is required to conform both of a communication with the road-side communication device and a communication with another vehicle, and to conform both of a traffic data service and a billing service. For example, the on-board unit which can carry out both of a communication with the road-side communication device and a communication with another vehicle is disclosed in Patent Literature 1 (JP 2008-99085A). The on-board unit disclosed in Patent Literature 1 has two antennas to carry out diversity, and the two antennas are connected with either a transmitting and receiving section for the communication with the road-side communication device or a transmitting and receiving section for the communication with the other vehicle, by a switch. Note that as well-known to a person skilled in the art, in the diversity, a communication quality is secured by using a plurality of communication paths and using a signal on another communication path, even if a signal on one of communication paths is degraded.

WAVE (wireless access in vehicular environment) is proposed as a communication standard to provide a plurality of services to (a vehicle loaded with) the on-board unit. WAVE is a standard determined by revising for a mobile terminal, IEEE 802.11 which is a wireless LAN standard, and uses IEEE 802.11p in layer 1 (a physical layer), and layer 2 (a data-link layer). One feature of WAVE is in that the autonomous decentralized control (DCF) is carried out in which a transmitter chance is equally given to each terminal. In detail, in WAVE, each communication frame is divided into a plurality of time slots, each of which is called a "channel". Each communication frame contains a single control channel and at least one service channel. A broadcast is carried out on the control channel, and a communication to transmit data to a specific transmission destination is carried out on the service channel. The communication terminal as a transmission source specifies a transmission destination communication terminal and a service channel on which a transmission is carried out, by using the control channel. The transmission destination communication terminal receives data from the communication terminal of the transmission source on the specified service channel.

One problem when a plurality of services are provided is in that the required communication speed and the required reliability may be different from each other among the plurality of services. For example, in the traffic data service, a large-volume data communication is requested whereas the required reliability may be relatively low. On the other hand, in the billing service, it is permissible that a communicable data quantity is less, whereas a high reliability is requested.

When the requested reliability is different among the plurality of services, it is considered to carry out the communication by using different communication speed ranges. In this case, when switching the service, it is necessary to switch the communication speed range. However, when a switching procedure is improper, a situation that an incomplete service is provided would occur. Especially, when the above-mentioned WAVE communication standard is used, it is not presupposed that the different communication speed range is used for the different service. Therefore, an issue of the switching procedure is fatal.

CITATION LIST

[Patent literature 1] JP 2008-99085A

SUMMARY OF THE INVENTION

Therefore, an object of the present invention is to optimize a switching procedure among a plurality of services with requested reliabilities being different.

The present invention provides a technique to carry out smooth switching among a plurality of services in an on-board unit which has two antennas and carries out diversity communication.

In detail, an aspect of the present invention, the on-board unit includes: a first antenna and a second antenna; a first service communicating section correlating with a first service; a second service communicating section correlating with a second service; a switch configured to switch a connection relation of each of the first antenna and the second antenna with the first service communicating section and the second service communicating section; and a control section configured to control the switch. The first service communicating section is configured to carry out a communication for the first service with a first communication device at a communication speed within a first communication speed range, and the second service communicating section is configured to carry out a communication for the second service with a second communication device at a communication speed within a second communication speed range. The first communication speed range is different from the second communication speed range. The on-board unit has first to third operation modes. When the on-board unit is set to the first operation mode, the switch connects both of the first antenna and the second antenna to the first service communicating section, and the first service communicating section carries out the communication for the first service to the first communication device at the communication speed within the first communication speed range. When the on-board unit is set to the first operation mode, and when the first service communicating section detects a reception of a radio signal for the communication for the second service from the second communication device, the on-board unit is switched to the second operation mode. When the on-board unit is set to the second operation mode, the switch connects one of the first antennas and the second antennas to the first service communicating section, and connects the other to the second service communicating section, the first service communicating section carries out the communication for the first service with the first communication device at the communication speed within the first communication speed range, and the second service communicating section carries out the communication for the second service with the second communication device at the communication speed within the second communication speed range. When the on-board unit is set to the second operation mode and when the control section completes disconnection processing to disconnect the communication for the first service, the on-board unit is switched to the third operation mode. When the on-board unit is set to the third operation mode, the switch connects both of the first antenna and the second antenna to the second service communicating section, and the second service communicating section carries out the communication for the second service with the second communication device at the communication speed within the second communication speed range.

In an embodiment, an upper limit of the second communication speed range is lower than an upper limit of the first communication speed range. In an example of the present embodiment, the first service is a traffic data service which provides traffic information to the on-board unit and the second service is a billing service in which processing of a fee charged on a user of the on-board unit is electronically carried out.

When the on-board unit is set to the first operation mode, it is desirable that the first service communicating section carries out the communication for the first service with the first communication device while carrying out diversity using the first antenna and the second antenna. Similarly, when the on-board unit is set to the third operation mode, it is desirable that the second service communicating section carries out the communication for the second service with the second communication device while carrying out diversity communication using the first antenna and the second antenna.

In another aspect of the present invention, a communication method is provided by an on-board unit which includes: a first antenna and a second antenna; a first service communicating section corresponding to a first service; a second service communicating section corresponding to a second service; and a switch configured to switch a connection relation of each of the first antenna and the second antenna with the first service communicating section and the second service communicating section. Here, the first service communicating section is configured to carry out a communication for the first service with a first communication device at a communication speed within a first communication speed range, and the second service communicating section is configured to carry out a communication for the second service with a second communication device at a communication speed within a second communication speed range. Also, the first communication speed range is different from the second communication speed range. The communication method includes: carrying out the communication for the first service with the first communication device at the communication speed within the first communication speed range by the first service communicating section, in a state that both of the first antenna and the second antenna are connected with the first service communicating section by the switch, when the on-board unit is set to a first operation mode; switching the on-board unit to a second operation mode, when the first service communicating section detects a reception of a radio signal for the communication for the second service from the second communication device, in case where the on-board unit is set to the first operation mode; carrying out the communication for the first service with the first communication device at the communication speed within the first communication speed range by the first service communicating section and the communication for the second service with the second communication device at the communication speed within the second communication speed range by the second service communicating section, in a state that one of the first antenna and the second antenna is connected with the first service communicating section and the other is connected with the second service communicating section by the switch, in case where the on-board unit is set to the second operation mode; carrying out disconnection processing to disconnect the communication for the first service when the on-board unit is set to the second operation mode; switching the on-board unit to a third operation mode after the disconnection processing is completed; and carrying out the communication for the second service with the second communication device at the communication speed within the second communication speed range by the second service communicating section in a state that both of the first antenna and the second antenna are connected with the second service communicating section by the switch when the on-board unit is set to the third operation mode.

In further another aspect of the present invention, a program is executed by an operation unit loaded in the on-board unit to achieve the above-mentioned communication method. The program may be recorded on a recording medium.

According to the present invention, it is possible to smoothly switch the first service and the second service in which the required reliabilities are different, and the reliability when each of the first service and the second service is carried out can be improved.

BRIEF DESCRIPTION OF THE DRAWINGS

FIG. 1 is a conceptual diagram showing the configuration of a communication system according to an embodiment of the present invention.

FIG. 3 is a block diagram showing the configuration of an on-board unit in the embodiment.

DESCRIPTION OF EMBODIMENTS

Figure 2A:
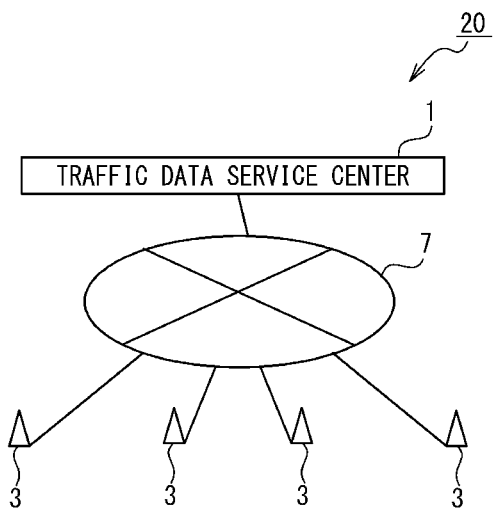
FIG. 2A is a conceptual diagram showing the configuration of a traffic data service network in the embodiment.

FIG. 1 is a conceptual diagram showing a configuration of a communication system 10 according to an embodiment of the present invention. In the present embodiment, the communication system 10 has a traffic data service center 1, a billing service center 2, road-side communication devices 3 and 4, and an on-board unit 6 loaded into a vehicle 5. In FIG. 1, a communicable area of each road-side communication device 3 (i.e. an area where the road-side communication device 3 can communicate with the on-board unit 6) is shown by 3a. A communicable area of each road-side communication device 4 (i.e. an area where the road-side communication device 4 can communicate with the on-board unit 6) is shown by 4*a*. The traffic data service center 1 is a host computer that has a function of collecting necessary data for provision of the traffic data service with and providing the traffic data service. Also, the billing service center 2 is a host computer that has a function of collecting necessary data for provision of a billing service and providing the billing service.

In the present embodiment, the communication system 10 provides two types of service: the traffic data service and the billing service, based on the communication between the road-side communication device and the vehicle. Here, the traffic data service is a service in which various types of traffic information is provided for the on-board unit 6 (and, equipment connected with the on-board unit 6). On the other hand, the billing service is a service in which charges (for example, a toll fee of toll road, a parking fee, and so on) to be imposed on a user of the vehicle 5 loaded with the on-board unit 6 are electronically processed.

In detail, as shown in the FIG. 2A, the traffic data service center 1 and the road-side communication devices 3 are connected by a communication network 7 to configure a traffic data service network 20 to provide the traffic data service. The traffic data service network 20 is a network to provide the traffic data service for the on-board unit 6 (and an equipment connected with it). In the traffic data service, the traffic data service center 1 provides various types of traffic information for the on-board unit 6 through the road-side communication device 3. As an example of the information to be provided for the on-board unit 6 in the traffic data service, congestion information, urgent vehicle approaching information, accident information, weather information, traffic control information, advertisement information and news information are exemplified.

Figure 2B:
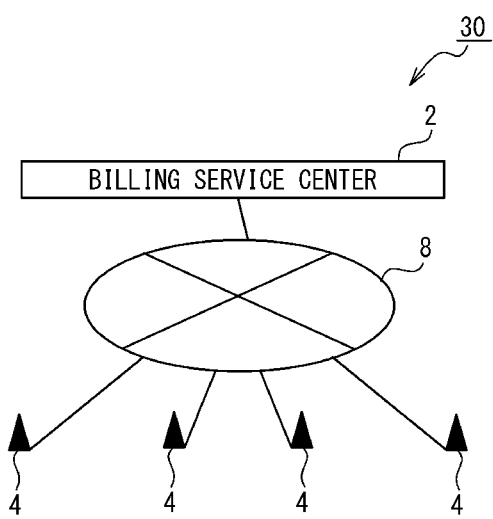
FIG. 2B is a conceptual diagram showing the configuration of a billing service network in the embodiment.

On the other hand, as shown in FIG. 2B, the billing service center 2 and the road-side communication devices 4 are connected by a communication network 8 to configure a billing service network 30 to provide the billing service. The billing service network 30 is a network to provide the billing service for the on-board unit 6 (and, the equipment connected with the on-board unit 6). In the billing service, the billing service center 2 and the on-board unit 6 exchange various types of information necessary for an accounting process of a fee to be charged on the user of the vehicle 5 loaded with the on-board unit 6 through the road-side communication device 4. As an example of the information to be exchanged between the billing service center 2 and the on-board unit 6 in the billing service, type-of-vehicle information (for example, information showing which of a standard-sized car, a large-sized car, and a motor-bicycle the vehicle 5 belongs to), billing card information (a type of a card inserted in the on-board unit 6, and a card number), and billing record information (billing record such as a start of billing) are exemplified.

As understood from FIG. 1, the traffic data service which is provided by the traffic data service center 1 and the road-side communication device 3 is a service that is provided for a relatively wide area (a wide area service), while the billing service that is provided by the billing service center 2 and the road-side communication device 4 is a service that is provided for a limited area (a local area service). Therefore, the on-board unit 6 is generally set to a traffic data service mode to receive the provision of the traffic data service. On the other hand, when the vehicle 5 approaches a billing area, that is, the vehicle 5 enters the communicable area 4*a* of the road-side communication device 4, the on-board unit 6 is switched to a billing service mode to receive the provision of the billing service.

Here, one feature of the communication system in the present embodiment is in that when the mode is switched from the traffic data service mode to the billing service mode, the on-board unit 6 is set once to a switching communication mode in which the traffic data service and the billing service are provided in parallel. The procedure of switching among the traffic data service mode, the billing service mode and the switching communication mode will be described later in detail.

FIG. 3 is a block diagram showing a configuration of the on-board unit 6 in the present embodiment. The on-board unit 6 has two antennas 31 and 32, a switch 33, a traffic data service communicating section 34, a billing service communicating section 35, a processing unit 36 and a storage unit 37.

The two antennas 31 and 32 have the functions of transmitting and receiving radio signals to and from the road-side communication devices 3 and 4. The on-board unit 6 is configured to be able to carry out the diversity using the two antennas 31 and 32, as mentioned later.

The switch 33 has a function of switching connection between the antennas 31 and 32, and the traffic data service communicating section 34 and the billing service communicating section 35. Here, the switch 33 is configured to be able to take the following at least three conditions: (1) the condition in which both of the antennas 31 and 32 are connected with the traffic data service communicating section 34; (2) the condition in which one of the antennas 31 and 32 is connected with the traffic data service communicating section 34 and the other is connected with the billing service communicating section 35; and (3) the condition in which both of the antennas 31 and 32 are connected with the billing service communicating section 35.

The switch 33 carries out a switching operation among the three conditions. The control of the operation of the switch 33 is carried out in response to a control signal 38 sent from the processing unit 36 based on the operation mode set to the on-board unit 6.

The traffic data service communicating section 34 is configured to be communicable with the road-side communication device 3 which is used for the communication for the traffic data service and has a radio circuit to transmit and receive a radio signal to and from the road-side communication device 3. The traffic data service communicating section 34 modulates the data (traffic data service transmission data) which is sent from the processing unit 36 in relation to the traffic data service to generate the radio signal which is transmitted to the road-side communication device 3. In addition, the traffic data service communicating section 34 demodulates the radio signal received from the road-side communication device 3 to generate the traffic data service reception data and sends the traffic data service reception data to the processing unit 36.

On the other hand, the billing service communicating section 35 is configured to be communicable with the road-side communication device 4 which is used for the communication for the billing service and has a radio circuit to transmit and receive a radio signal to and from the road-side communication device 4. The billing service communicating section 35 modulates the billing service transmission data which is sent from the processing unit 36 in relation to the billing service to generate a radio signal transmitted to the road-side communication device 3. In addition, the traffic data service communicating section 34 demodulates the radio signal received from the road-side communication device 3 to generate billing service reception data and sends the billing service reception data to the processing unit 36.

The processing unit 36 has the following three functions. First, the processing unit 36 has a traffic data service data processing function 41 of processing the data related to the traffic data service. In the traffic data service data processing function 41, the processing unit 36 processes the traffic data service reception data received from the traffic data service communicating section 34, and generates and supplies the traffic data service transmission data to the traffic data service communicating section 34. In the processing of the traffic data service data processing function 41, necessary data is stored in the storage unit 37 as traffic data service data 44. Also, the display data which is displayed on the display unit 9 connected with the on-board unit 6 is generated by the processing of the traffic data service data processing function 41. Various types of traffic information (for example, congestion information, urgent vehicle approaching information, accident information, weather information, traffic control information, advertisement information and news information) is contained in the display data and the user can know various types of traffic information by seeing the display unit 9. For example, the display unit 9 may be an equipment such as a car navigation system or may be a display unit dedicated for the on-board unit 6.

Second, the processing unit 36 has a billing service data processing function 42 of processing the data related to the billing service. In the billing service data processing function 42, the processing unit 36 processes the billing service reception data received from the billing service communicating section 35, and generates and supplies the billing service transmission data to the billing service communicating section 35. In the processing of the billing service data processing function 42, necessary data is stored in the storage unit 37 as the billing service data 45.

Third, the processing unit 36 has a communication switching control function 43 which carries out the switching of the operation mode of the on-board unit 6. As mentioned above, there are the three operation modes of the traffic data service mode, the billing service mode, and the switching communication mode in the on-board unit 6. In the communication switching control function 43, the processing unit 36 selects one from among these operation modes and generates a control signal 38 which controls the switch 33 according to the selection of the operation mode.

Each function of such a processing unit 36 may be realized by executing a software program, which has been stored in the storage unit 37, by the processing unit 36. The installation of the program in the storage unit 37 may be carried out by using a recording medium storing the program.

In this case, in the present embodiment, the communication for the traffic data service which is carried out between the traffic data service communicating section 34 and the road-side communication device 3 and the communication for the billing service which is carried out between the billing service communicating section 35 and the road-side communication device 4 are different in a communication speed and the reliability to be requested. Specifically, in the communication for the traffic data service, a fast communication speed is requested, but the communication in a relatively low reliability is permissible. On the other hand, in the communication for the billing service, a low communication speed is permissible, but the communication with a high reliability is requested.

Therefore, a permissible range of the communication speed is different between the communication for the traffic data service which is carried out between the traffic data service communicating section 34 and the road-side communication device 3 and the communication for the billing service which is carried out between the billing service communicating section 35 and the road-side communication device 4. In detail, each of the traffic data service communicating sections 34 and the billing service communicating sections 35 is configured to monitor BER (bit error rate) of the communication to be carried out and to switch the communication speed according to BER. At this time, an upper limit value of the communication speed range which is used in the communication for the billing service is set lower than an upper limit value of the communication speed range which is used in the communication for the traffic data service. Thus, in the communication for the billing service, the communication is carried out in a high reliability and in the communication for the traffic data service, the communication at a high-speed communication speed is carried out.

Figure 4A:
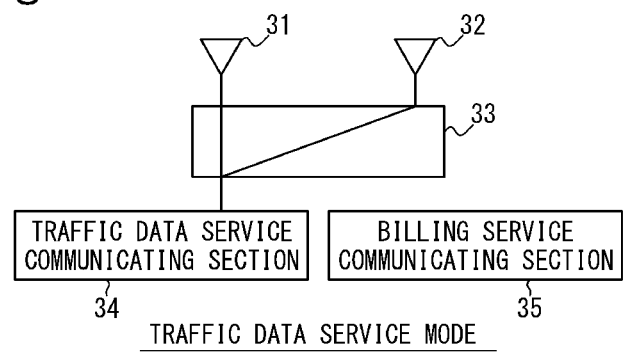
FIG. 4A is a conceptual diagram showing a state of a switch in a traffic data service mode.

Below, the operation of the on-board unit 6 of the present embodiment having such a configuration will be described. As mentioned above, the on-board unit 6 of the present embodiment has the three operation modes: the traffic data service mode, the switching communication mode and the billing service mode. As shown in FIG. 4A, when the on-board unit 6 is set to the traffic data service mode, the switch 33 connects both of the antennas 31 and 32 with the traffic data service communicating section 34 in response to the control signal 38 supplied from the processing unit 36. The traffic data service communicating section 34 carries out the communication for the traffic data service by using both of the antennas 31 and 32. At this time, the traffic data service communicating section 34 carries out the diversity using the two antennas 31 and 32. In the diversity using the antennas 31 and 32, there are at least one of transmission diversity and reception diversity. Also, in the diversity, any of the spatial diversity, the polarization diversity, and the angle diversity may be carried out. By carrying out the diversity, it is possible to improve the reliability of the communication for traffic data service.

Figure 4B:
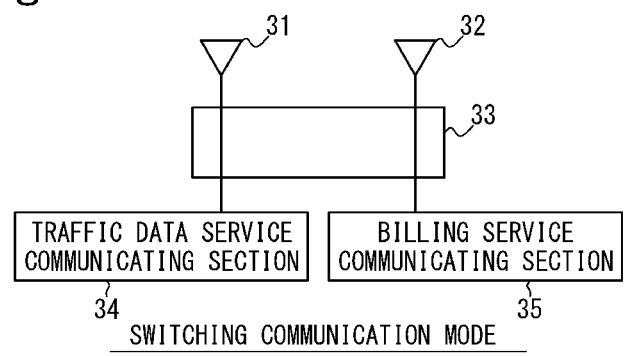
FIG. 4B is a conceptual diagram showing a state of the switch in a switching communication mode.

Also, when the on-board unit 6 is set to the switching communication mode, as shown in FIG. 4B, the switch 33 connects one of the antennas 31 and 32 with the traffic data service communicating section 34 and connects the other with the billing service communicating section 35. In this case, the traffic data service communicating section 34 carries out the communication for traffic data service by using the one of the antennas, and the billing service communicating section 35 carries out the communication for billing service by using the other antenna.

Figure 4C:
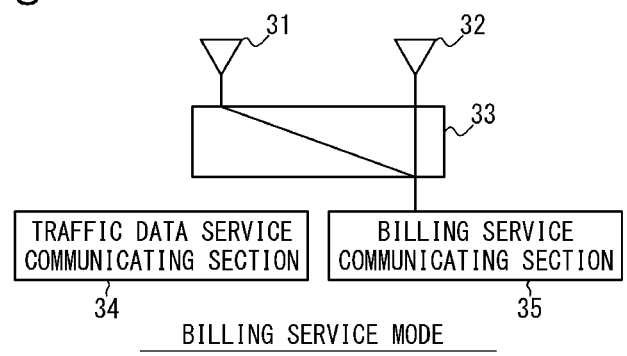
FIG. 4C is a conceptual diagram showing a state of the switch in the billing service mode.

Moreover, when the on-board unit 6 is set to the billing service mode as shown in FIG. 4C, the switch 33 connects both of the antennas 31 and 32 with the billing service communicating section 35. The billing service communicating section 35 carries out the communication for billing service by using both of the antennas 31 and 32. In this case, the billing service communicating section 35 carries out the diversity using the two antennas 31 and 32.

A point to which the attention should paid in case of switching among the traffic data service mode, the switching communication mode, and the billing service mode is in that a permissible range of communication speed is different between the communication for traffic data service and the communication for billing service. This occurs a situation that even if the vehicle 5 loaded with the on-board unit 6 which has been set to the traffic data service mode approaches a billing area (that is, the communicable area 4a of the road-side communication device 4), the traffic data service communicating section 34 cannot receive a radio signal of the communication for billing service which is sent from the road-side communication device 4 normally (that is, demodulation cannot be carried out normally). Here, it can be detected that a radio signal was inputted from the road-side communication device 4.

Therefore, in the present embodiment, when the traffic data service communicating section 34 detects that the radio signal was inputted from the road-side communication device 4, the traffic data service communicating section 34 notifies the detection to the processing unit 36. When it is notified from the traffic data service communicating section 34 that the radio signal has been inputted from the road-side communication device 4, the processing unit 36 switches the on-board unit 6 to the switching communication mode. Thus, in the on-board unit 6, the billing service communicating section 35 can carry out the communication for billing service while the traffic data service communicating section 34 continues the communication for traffic data service.

In addition, when the on-board unit 6 is switched to the switching communication mode, the traffic data service data processing function 41 of the processing unit 36 carries out disconnection processing to stop the traffic data service normally (for example, the processing of transmitting the data showing that the on-board unit 6 ends the reception of data of the traffic data service, from the on-board unit 6 to the traffic data service center 1). After the disconnection processing is complete, the processing unit 36 switches the on-board unit 6 to the billing service mode. Thus, after that, only the communication for billing service is carried out.

According to such a procedure, the switching between two services different in requested reliability can be smoothly carried out. Especially, by switching the operation mode of the on-board unit 6 from the traffic data service mode to the billing service mode through the switching communication mode, the communicable time of the traffic data service mode and the communicable time of the billing service mode can be secured for long times. Wasteful data resending can be restrained because the disconnection processing of the traffic data service is surely carried out by securing the communicable time of the traffic data service mode for the long time. Also, the billing service can be provided surely by securing the communicable time of the billing service mode for the long time.

In addition, the diversity using two antennas 31 and 32 is carried out in the traffic data service mode and the billing service mode, so that the reliability of the communication in each of the operation modes can be further improved.

Figure 5:
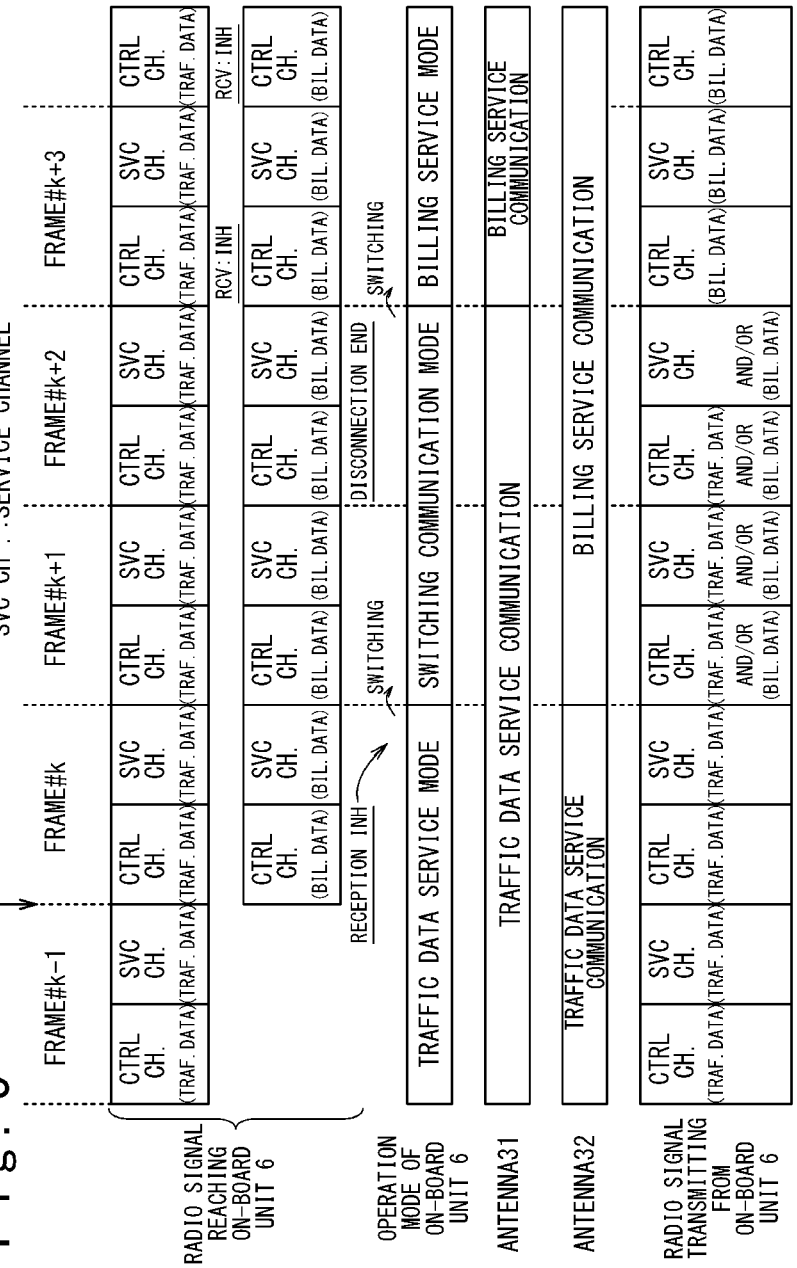
FIG. 5 is a conceptual diagram showing a procedure of switching from the traffic data service to the billing service in the embodiment.

FIG. 5 is a diagram showing an example of the operation of the on-board unit 6 of the present embodiment, especially, the operation of the on-board unit 6 when the on-board unit 6 is switched from the traffic data service mode to the billing service mode through the switching communication mode. FIG. 5 shows the operation example when communication between the road-side communication devices 3 and 4 and the on-board unit 6 loaded into the vehicle 5 is carried out based on the communication standard of WAVE. As mentioning above, each communication frame contains a single control channel and at least one service channel in the WAVE communication. A broadcast is carried out on the control channel, and the communication of transmitting data to a specific transmission destination is carried out on the service channel.

Here, in FIG. 5, the control channel of each communication frame of the radio signal transmitted from the road-side communication device 3 of the traffic data service network 20 to the on-board unit 6 is shown as "CTRL CH. (traffic data)" and the service channel is shown as "SVC CH. (traffic data)". Also, the control channel of each communication frame of the radio signal transmitted from the road-side communication device 4 of the billing service network 30 to the on-board unit 6 is shown as "CTRL CH. (billing)" and the service channel is shown as "SVC CH. (billing)". In FIG. 5, the operation of the on-board unit 6 is shown, supposing that the communication frame of the communication for traffic data service and the communication frame of the communication for the billing service are synchronous each other. That is, when the vehicle 5 (and the on-board unit 6) entries the billing area to be mentioned later, the communication on the control channel of the traffic data service and the communication on the control channel of the billing service are carried out at the same time. However, the communication frame of the communication for traffic data service and the communication frame of the communication for billing service do not have to be always synchronous.

In the same way, the control channel of each communication frame of the radio signal transmitted from the on-board unit 6 to the road-side communication device 3 of the traffic data service network 20 is shown as "CTRL CH. (traffic data)" and the service channel is shown as "SVC CH. (traffic data)". Moreover, the control channel of each communication frame of the radio signal transmitted from the on-board unit 6 to the road-side communication device 4 of the billing service network 30 is is shown as "CTRL CH. (billing)" and the service channel is shown as "SVC CH. (billing)". Here, the control channel when the on-board unit 6 can transmit the radio signals to both of the road-side communication devices 3 and 4 is shown as "CTRL CH. (traffic data) and/or (billing)" and the service channel is shown as "SVC CH. (traffic data) and/or (billing)".

In an initial state (communication frame #k−1 and communication frames before it), the on-board unit 6 is supposed to have been set to the traffic data service mode. In this case, the traffic data service communicating section 34 of the on-board unit 6 is connected with the antennas 31 and 32 and is communicating with the road-side communication device 3 of the traffic data service network 20 by using the antennas 31 and 32. In case of communication between the traffic data service communicating section 34 and the road-side communication device 3, a broadcast is carried out on the control channel and the communication is carried out in which a counterpart is specified on the service channel. In this case, the diversity is carried out by using the two antennas 31 and 32 to improve the reliability of the communication of the traffic data service.

When the vehicle 5 loaded with the on-board unit 6 approaches a billing area (that is, communicable area 4a of the road-side communication device 4 of the billing service network 30), the communication frame from the road-side communication device 4 reaches the on-board unit 6 in addition to the communication frame from the road-side communication device 3 of the traffic data service network 20. Accordingly, the communication frame from the road-side communication device 4 reaches the traffic data service communicating section 34.

At this time, because a range of the communication speed used for the communication by the traffic data service communicating section 34, i.e. the communication speed which is permissible for the communication for traffic data service is different from a range of the communication speed which is permitted for the communication for billing service, the traffic data service communicating section 34 cannot recognize the communication frame transmitted from the road-side communication device 4 as a right communication frame. However, the traffic data service communicating section 34 can detect that the communication frame has reached from the road-side communication device 4. It is notified to the processing unit 36 that the traffic data service communicating section 34 received the communication frame from the road-side communication device 4 of the billing service network 30.

When it is notified from the traffic data service communicating section 34 that the communication frame from the road-side communication device 4 is received, the processing unit 36 switches the on-board unit 6 to the switching communication mode. In FIG. 5, in the communication frame next to the communication frame which has reached first from the road-side communication device 4, the on-board unit 6 is set to the switching communication mode. Thus, one of the antennas 31 and 32 is connected with the traffic data service communicating section 34 and the other is connected with the billing service communicating section 35. Thus, the on-board unit 6 is set to the state that the billing service communicating section 35 can carry out the communication for billing service while the traffic data service communicating section 34 continues the communication for traffic data service.

In case of the communication between the traffic data service communicating section 34 and the road-side communication device 3, a broadcast is carried out on the control channel, and the communication in which a counterpart is specified is carried out on the service channel. In the same way, in case of the communication between the billing service communicating section 35 and the road-side communication device 4, a broadcast is carried out on the control channel, and the communication in which a counterpart is specified is carried out on the service channel.

In addition, when the on-board unit 6 is switched to the switching communication mode, the traffic data service data processing function 41 of the processing unit 36 carries out the disconnection processing to stop the traffic data service normally (for example, the processing of transmitting the data showing that the on-board unit 6 ends the reception of the data of the traffic data service, from the on-board unit 6 to the traffic data service center 1).

After the disconnection processing is complete, the processing unit 36 switches the on-board unit 6 to the billing service mode. Thus, both of the antennas 31 and 32 are connected with the billing service communicating section 35 of the on-board unit 6. After that, the billing service communicating section 35 communicates with the road-side communication device 4 of the billing service network 30 by using both of the antennas 31 and 32. As mentioned above, in case of the communication between the billing service communicating section 35 and the road-side communication device 4, a broadcast is carried out on the control channel, and the communication in which a counterpart is specified is carried out on the service channel. In this case, the diversity is carried out by using the two antennas 31 and 32 to improve the reliability of the communication of the billing service.

Moreover, when the accounting by the billing service completes, the processing unit 36 returns the on-board unit 6 to the traffic data service mode from the billing service mode. When the on-board unit 6 returns to the traffic data service mode, both of the antennas 31 and 32 are connected with the traffic data service communicating section 34 of the on-board unit 6. After that, the traffic data service communicating section 34 communicates with the road-side communication device 3 of the traffic data service network 20 by using both of the antennas 31 and 32.

As described above, by switching the operation mode of the on-board unit 6 from the traffic data service mode to the billing service mode through the switching communication mode, the communicable time of the traffic data service mode and the communicable time of the billing service mode can be secured for long times. Also, by carrying out the diversity using the two antennas 31 and 32 in the traffic data service mode and the billing service mode, the reliability of the communication can be further improved in each operation mode.

In the above, the embodiments in which the traffic data service and the billing service are switched have been described. However, note that the present invention can be generally applied to the switching between the two services in which the requested reliabilities are different.

The embodiments of the present invention have been specifically described but the present invention is not limited to the above-mentioned embodiments. It could be understood to the skilled person that the present invention can be implemented with various modifications.

The invention claimed is:

1. An on-board unit comprising:
a first antenna and a second antenna;
a first service communicating section corresponding to a first service;
a second service communicating section corresponding to a second service;
a switch configured to switch a connection relation of each of the first antenna and the second antenna with the first service communicating section and the second service communicating section; and
a control section configured to control the switch,
wherein the first service communicating section is configured to carry out a communication for the first service with a first communication device at a communication speed within a first communication speed range,
wherein the second service communicating section is configured to carry out a communication for the second service with a second communication device at a communication speed within a second communication speed range,
wherein the first communication speed range is different from the second communication speed range,
wherein the on-board unit has first to third operation modes,
wherein when the on-board unit is set to the first operation mode, the switch connects both of the first antenna and the second antenna with the first service communicating section, and the first service communicating section carries out the communication for the first service with the first communication device at the communication speed within the first communication speed range,
wherein when the on-board unit is set to the first operation mode, and when the first service communicating section detects a reception of a radio signal for the communication for the second service from the second communication device, the on-board unit is switched to the second operation mode,
wherein when the on-board unit is set to the second operation mode, the switch connects one of the first antennas and the second antennas with the first service communicating section, and connects the other with the second service communicating section, the first service communicating section carries out the communication for the first service with the first communication device at the communication speed within the first communication speed range, and the second service communicating section carries out the communication for the second service with the second communication device at the communication speed within the second communication speed range, wherein when the on-board unit is set to the second operation mode and when the control section completes disconnection processing to disconnect the communication for the first service, the on-board unit is switched to the third operation mode, wherein when the on-board unit is set to the third operation mode, the switch connects both of the first antenna and the second antenna with the second service communicating section, and the second service communicating section carries out the communication for the second service with the second communication device at the communication speed within the second communication speed range, and wherein an upper limit of the second communication speed range is lower than an upper limit of the first communication speed range.

2. The on-board unit according to claim 1, wherein the second service is a billing service in which processing of a fee charged on a user of the on-board unit is electronically carried out, and wherein the first service is a traffic data service in which traffic data is provided to the on-board unit.

3. The on-board unit according to claim 1, wherein, when the on-board unit is set to the first operation mode, the first service communicating section carries out the communication for the first service with the first communication device while carrying out diversity using the first antenna and the second antenna.

4. The on-board unit according to claim 1, wherein, when the on-board unit is set to the third operation mode, the second service communicating section carries out the communication for the second service with the second communication device while carrying out diversity using the first antenna and the second antenna.

5. A communication method by an on-board unit which comprises:
a first antenna and a second antenna;
a first service communicating section corresponding to a first service;
a second service communicating section corresponding to a second service; and
a switch configured to switch a connection relation of each of the first antenna and the second antenna with the first service communicating section and the second service communicating section,
wherein the first service communicating section is configured to carry out a communication for the first service with a first communication device at a communication speed within a first communication speed range,
wherein the second service communicating section is configured to carry out a communication for the second service with a second communication device at a communication speed within a second communication speed range, and
wherein the first communication speed range is different from the second communication speed range,
the communication method comprising:
carrying out the communication for the first service with the first communication device at the communication speed within the first communication speed range by the first service communicating section, in a state that both of the first antenna and the second antenna are connected with the first service communicating section by the switch, when the on-board unit is set to a first operation mode;
switching the on-board unit to a second operation mode, when the first service communicating section detects a reception of a radio signal for the communication for the second service from the second communication device, in case where the on-board unit is set to the first operation mode;
carrying out the communication for the first service with the first communication device at the communication speed within the first communication speed range by the first service communicating section, and the communication for the second service with the second communication device at the communication speed within the second communication speed range by the second service communicating section, in a state that one of the first antenna and the second antenna is connected with the first service communicating section and the other is connected with the second service communicating section by the switch, in case where the on-board unit is set to a second operation mode;
carrying out disconnection processing to disconnect the communication for the first service when the on-board unit is set to the second operation mode;
switching the on-board unit to a third operation mode after the disconnection processing is completed; and
carrying out the communication for the second service with the second communication device at the communication speed within the second communication speed range by the second service communicating section in a state that both of the first antenna and the second antenna are connected with the second service communicating section by the switch when the on-board unit is set to the third operation mode,
wherein an upper limit of the second communication speed range is lower than an upper limit of the first communication speed range.

6. A non-transitory storage medium on which a program is stored for execution by a processing unit of an on-board unit, the on-board unit comprising:
a first antenna and a second antenna;
a first service communicating section corresponding to a first service;
a second service communicating section corresponding to a second service; and
a switch configured to switch a connection relation of each of the first antenna and the second antenna with the first service communicating section and the second service communicating section,
wherein the first service communicating section is configured to carry out a communication for the first service with a first communication device at a communication speed within a first communication speed range,
wherein the second service communicating section is configured to carry out a communication for the second service with a second communication device at a communication speed within a second communication speed range, and wherein the first communication speed range is different from the second communication speed range, the program, when executed by the processing unit of the on-board unit, causing the on-board unit to achieve the functions of:

carrying out the communication for the first service with the first communication device at the communication speed within the first communication speed range by the first service communicating section, in a state that both of the first antenna and the second antenna are connected with the first service communicating section by the switch, when the on-board unit is set to a first operation mode;

switching the on-board unit to a second operation mode, when the first service communicating section detects a reception of a radio signal for the communication for the second service from the second communication device, in case where the on-board unit is set to the first operation mode;

carrying out the communication for the first service with the first communication device at the communication speed within the first communication speed range by the first service communicating section and the communication for the second service with the second communication device at the communication speed within the second communication speed range by the second service communicating section, in a state that one of the first antenna and the second antenna is connected with the first service communicating section and the other is connected with the second service communicating section by the switch, in case where the on-board unit is set to the second operation mode;

carrying out disconnection processing to disconnect the communication for the first service when the on-board unit is set to the second operation mode;

switching the on-board unit to a third operation mode after the disconnection processing is completed; and carrying out the communication for the second service with the second communication device at the communication speed within the second communication speed range by the second service communicating section in a state that both of the first antenna and the second antenna are connected with the second service communicating section by the switch when the on-board unit is set to the third operation mode, wherein an upper limit of the second communication speed range is lower than an upper limit of the first communication speed range.

* * * * *